(12) United States Patent
Woleben

(10) Patent No.: US 8,000,708 B1
(45) Date of Patent: Aug. 16, 2011

(54) SEAMLESS INTER-NETWORK HANDOFF

(75) Inventor: Samuel M. Woleben, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1008 days.

(21) Appl. No.: 11/853,293

(22) Filed: Sep. 11, 2007

(51) Int. Cl.
*H04W 36/00* (2009.01)

(52) U.S. Cl. ........ 455/436; 455/437; 455/438; 455/439; 455/440; 455/441; 455/442; 455/443; 455/444; 455/450; 455/451; 370/329; 370/330; 370/331; 370/334; 370/341

(58) Field of Classification Search ......... 455/436, 455/437, 438, 439, 440, 441, 442, 443, 444, 455/450, 451, 452.1, 452.2, 509; 370/331, 370/328, 329, 330, 332, 334, 341
See application file for complete search history.

(56) References Cited

U.S. PATENT DOCUMENTS

| | | | | |
|---|---|---|---|---|
| 6,055,427 A * | 4/2000 | Ojaniemi | .................. | 455/436 |
| 6,263,205 B1 * | 7/2001 | Yamaura et al. | .................. | 455/442 |
| 6,438,116 B1 * | 8/2002 | Corbett | .................. | 370/331 |
| 7,224,972 B2 * | 5/2007 | Pischella | .................. | 455/436 |
| 7,483,483 B2 * | 1/2009 | Lakkis | .................. | 375/238 |
| 7,515,562 B2 * | 4/2009 | Lim et al. | .................. | 370/331 |
| 7,609,675 B2 * | 10/2009 | Lee et al. | .................. | 370/331 |
| 7,864,732 B2 * | 1/2011 | Lo et al. | .................. | 370/331 |
| 2003/0129982 A1 * | 7/2003 | Perini | .................. | 455/442 |
| 2004/0028015 A1 * | 2/2004 | Fouilland et al. | .................. | 370/337 |

* cited by examiner

*Primary Examiner* — Olumide T Ajibade Akonai

(57) ABSTRACT

A method, system, and medium are provided for increasing the robustness of communications sessions between mobile devices and communications networks through handoff diversity. Separating the handoff times through handoff diversity provides for continuous transmission of data and decreases the likelihood of dropped calls and lost data. In a communications session capable of communicating data through multiple channels, handoff diversity is implemented by ensuring that at least one communication channel's handoff is complete and transferring data prior to initiating a handoff within another channel. In one illustrative embodiment, the present invention configures the physical propagation environment of the channels to create diversity in channel-handoff occurrences. In another illustrative embodiment, the communications network or mobile device is configured to force channel-handoff diversity by delaying a handoff for one or more communication channels.

20 Claims, 11 Drawing Sheets

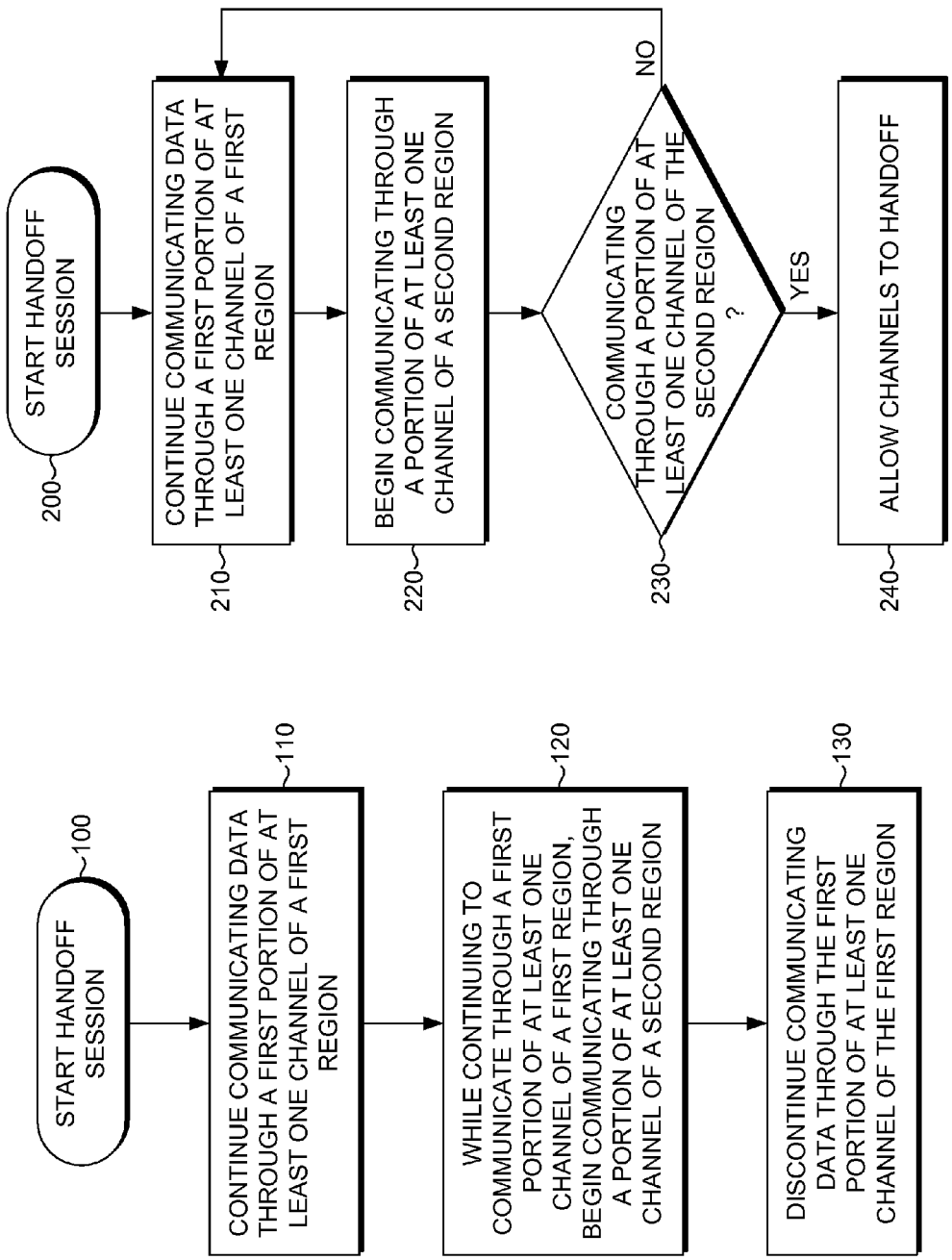

SEAMLESS INTER-NETWORK HANDOFF

SUMMARY

The present invention is defined by the claims below but, summarily, embodiments of the present invention increase the robustness of communications sessions between mobile devices and communications networks. A method and system using computer-readable media provides, among other things, increased robustness of communications sessions including continuous transmission of data and reduced chances of dropped calls or lost data. By providing handoff diversity for handoffs occurring within channels communicating data between the communications network and mobile device, the embodiments of the present invention thereby solve problems associated with the current art of communications sessions.

The present invention has several practical applications in the technical arts including providing mobile users with more reliable communications sessions having fewer dropped calls, interruptions in data communications, and lost data. This is done through systems and methods, implemented alone or in combination, that create channel-handoff diversity in a communications system having multiple channels for communicating data between the communications network and mobile devices. In one exemplary embodiment, the present invention configures the physical propagation environment of the channels to create diversity in channel-handoff occurrences. In another illustrative embodiment, the communications network or mobile device is configured to force channel-handoff diversity by delaying a handoff for one or more communication channels.

In a first aspect, a set of computer-useable instructions provides a method of increasing the robustness of a communications session between a communications network and a mobile device. The communications session is capable of communicating a stream of data through multiple communication channels. The method is carried out by providing two or more channels, each having a first and second channel portion associated with a first and second geographic region, respectively. The communication network receives a request to handoff communication of a data stream from one or more first portions of the channels to one or more second portions of the channels. Communication of a first part of the data stream is maintained over the first portion of at least a first channel while a handoff is initiated within a second channel of a second part of the data stream from the first portion of the second channel to the second portion of the second channel.

In a second aspect, a set of computer-useable instructions provides a method of increasing the robustness of a communications session between a communications network and a mobile device. The communications session is capable of communicating a stream of data via multiple communication channels. The method is carried out by providing two or more channels, each having a first and second channel portion associated with a first and second geographic region, respectively. The method includes determining, at the mobile device, that a handoff is necessary and maintaining communication of a first part of the data stream over the first portion of at least a first channel while a handoff is initiated within a second channel of a second part of the data stream from the first portion of the second channel to the second portion of the second channel.

In a third aspect, a method is provided for increasing the robustness of a communications session between a communications network and a mobile device. The communications session is capable of communicating a stream of data via multiple communication channels, and the network includes a plurality of radio frequency ("RF") emitters that emit RF over geographic regions that are respectively associated with at least one of the RF emitters. The method includes providing an RF power level associated with each portion of a communication channel. The first portions of each channel are associated with a first region and the second portions of each channel are associated with a second region. The method is carried out by causing the handoff locations within each channel to be geographically separated from one another by differentiating the RF power levels associated with the first portions of each channel in the first region and differentiating the RF power levels associated with the second portions of each channel in the second region.

In a fourth aspect, a system is provided for increasing the robustness of a communications session between a communications network and a mobile device. The communications session is capable of communicating a stream of data via multiple communication channels, and the network includes a plurality of radio frequency ("RF") emitters that emit RF over geographic regions that are respectively associated with at least one of the RF emitters. The system includes RF emitters associated with each portion of a communication channel. Specifically, two RF emitters, located in a first region, are each associated with first portions of a first and second channel, and two RF emitters, located in a second region, are each associated with second portions of the first and second channel. Additionally, the first portions of each channel intersect with the second portions of that channel. In the system provided, the intersection of the first and second portions of the first channel is situated at a geographically separate location from the intersection of the first and second portions of the second channel.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1 is a method by which the present invention may be used in order to provide a more robust communications session through handoff diversity according to an embodiment of the present invention;

FIG. 2 is a method by which the present invention may be used in order to provide a more robust communications session through handoff diversity involving a confirmation step according to an embodiment of the present invention;

DETAILED DESCRIPTION

Figure 3:
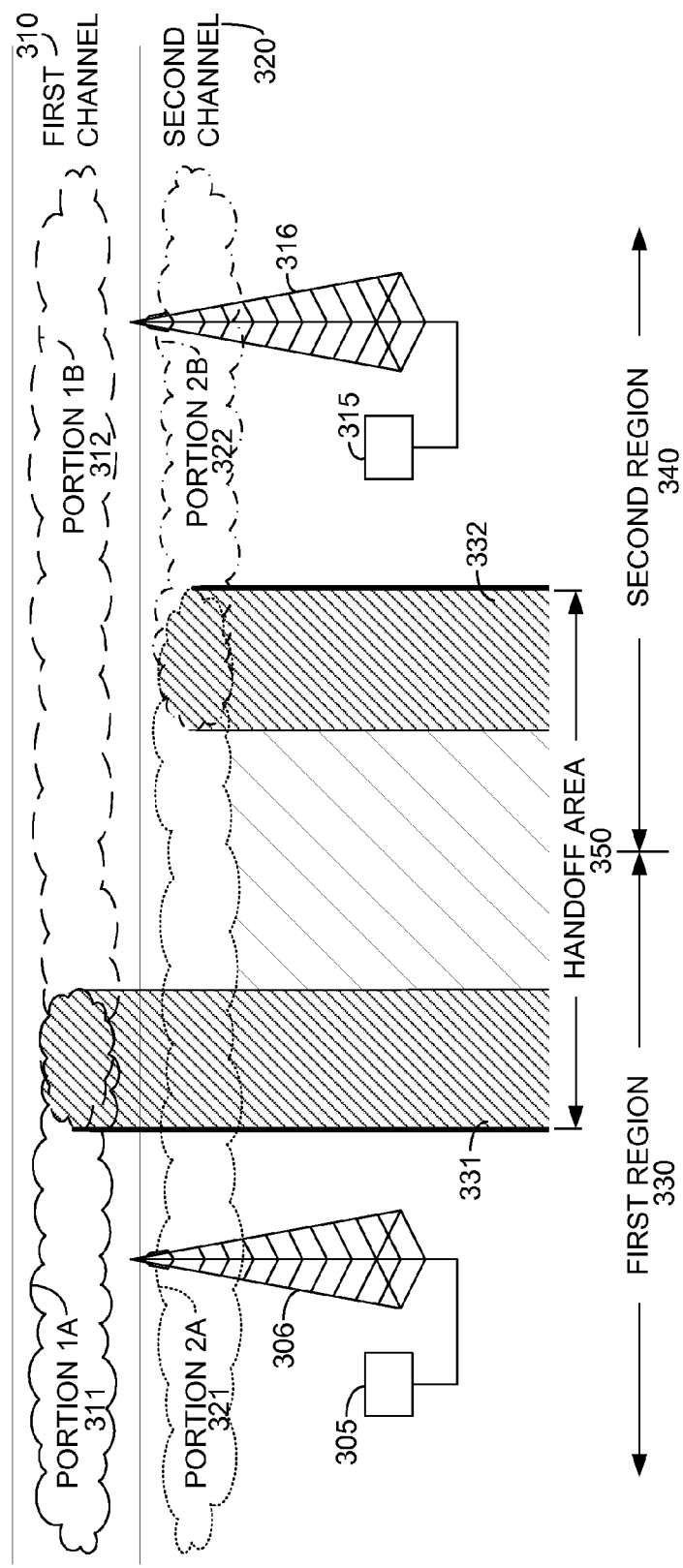
FIG. 3 is a view of an exemplary environment using RF optimization for creating handoff diversity according to an embodiment of the present invention.

Embodiments of the present invention provide systems and methods for increasing the robustness of communications sessions between mobile devices and communications networks through handoff diversity. Specifically, separating the handoff times for communications channels, in a communications session capable of communicating data through multiple channels, provides for continuous transmission of data and decreases the likelihood of dropped calls and lost data.

Mobile devices communicate with a communications network via portions of one or more wireless communication channels. Each portion of a communication channel is associated with a site or geographic region and propagated via RF emitters located within the region. The RF emitters, which transmit and receive radio signals, are usually situated on towers located within the region and coupled to a Base Transceiver Station ("BTS") which facilitates wireless communication between mobile devices and the communications network. Each BTS may be coupled to a communications network controller such as a Radio Network Controller ("RNC") which carries out radio resource management and which may also be associated with the region. The boundaries of a region are approximately determined by the power levels of the RF propagation of the channel portions.

Typically, a handoff occurs when a mobile device travels from a first region to a second region and crosses this boundary while communicating with the communication network. As the device crosses this boundary, the stream of data communicated between the device and the communications network must transition from channel portions associated with the first region to channel portions associated with the second region. Specifically, as the mobile device travels from a first region associated with a first BTS and RNC to a second region associated with a second BTS and RNC, the device detects the second BTS and RNC and a handoff is initiated. In the current art, the data stream communicated between the device and the communications network, originally connected via channel portions associated with the first region, must be broken off from communicating via channel portions associated with the first region and reestablished over channel portions associated with the second region. This may be characterized as a "break-before-make" handoff operation.

Various embodiments of the present invention add intelligence to the handoff process to ensure connection robustness. For example, in a communications session capable of communicating data through multiple channels, the data stream may be distributed across multiple channels. The communications network controllers or RNCs know whether the mobile device is communicating over multiple channels. Handoff diversity can be implemented by ensuring that at least one channel's handoff is complete and transferring data prior to allowing a second channel to transition. As a mobile device travels into a new region, it may detect a second BTS and RNC. This information may be communicated to the communications network and used to request a handoff of the data stream to the second BTS and RNC. Using this information combined with knowledge that the mobile device is communicating over multiple channels, the RNC associated with the first region can select at least one channel to be a delayed-handoff channel and force the handoff of that channel to wait until confirmation is received, from the RNC in the second region, that a handoff of at least a second channel has completed successfully.

Once the RNC associated with the first region confirms that at least a second channel has handed off, it can break or terminate the original data flow to the delayed-handoff channel and allow that channel to handoff. Alternatively, instead of waiting for confirmation, the RNC associated with the first region may delay the handoff of the delayed-handoff channel for a specified time interval, thereby increasing the odds that another channel will have completed a handoff operation. In the event that the at least a second channel does not hand off, a different channel could be selected as a delayed-handoff channel, thereby allowing a handoff to be attempted within the first selected channel. This process could continue for multiple iterations until successful.

During the handoff operations, the data stream is routed through the portions of the channels communicating with the mobile device. When the connection with a first portion of a first channel is broken, as that channel undergoes a handoff, the data may be rerouted to the mobile device over the delayed-handoff channel. Once the handoff within the first channel is completed and a connection is reestablished via a second portion of the first channel associated with a second region, the delayed-handoff channel may be allowed to handoff and data may be rerouted via the second portion of the first channel. Thus, continuous communication of data between the mobile device and communication network is made possible, and any data lost during a handoff operation may be recommunicated. Accordingly, the process employed by the present invention may be characterized as a "make-before-brake" handoff operation.

By analogy, the advantages provided by embodiments of the present invention may be compared to two people crossing a deep canyon. Each side of the canyon may be thought of as a region, with handoffs occurring as the canyon is traversed. Using the current art employing break-before-make handoff operations, both people crossing the canyon would leap over the canyon simultaneously and hope to land on the other side. But if our hypothetical daredevils didn't make it to the other side, they would fall into the canyon and the call or data would be lost.

In contrast, the present invention is more akin to helping each other over the canyon. Specifically, it is like having the first person cross the canyon and then having the second person cross when the first one is known to be safe. This can be done with or without help or feedback. There is much lower probability that both people will fall into the canyon and the call or data will be lost. Furthermore, at least one person is always in contact with at least one side of the canyon.

Various telecommunications standards may be employed by the present invention to facilitate the wireless transmission of data through radio signals. One such standard is the Evolution-Data Optimized or Evolution-Data Only ("EV-DO") standard originally developed by Qualcomm Inc. of San Diego, Calif. A further evolution of the EV-DO standard, called EV-DO Rev B, provides several advantages over the original EV-DO standard and may be used in some embodiments of the present invention. The wireless communication technology may employ Code Division Multiple Access ("CDMA"), Global System for Mobile communications ("GSM"), WiFi, WiMAX, or other wireless communication standards. Thus, for an embodiment using CDMA, a communication channel may comprise a 1.25 MHz radio channel.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 1 × RTT | 1 times Radio Transmission Technology |
| BTS | Base Transceiver Station |
| CDMA | Code Division Multiple Access |
| EV-DO Rev B | Evolution-Data Optimized Revision B |
| GSM | Global System for Mobile communications |
| PDA | Personal digital assistant |
| PSTN | Public Switched Telephone Network |
| RF | Radio Frequency |
| RNC | Radio Network Controller |

Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

FIG. 1 depicts an illustrative method in which embodiments of the present invention may be practiced. At step 100, a handoff session is initiated for a communications session communicating via multiple channels. A communication channel extends across multiple regions, with each region associated with a portion of the communication channel that is propagated by RF emitters. In this illustrative embodiment, the handoff session occurs as a mobile device travels from a first region to a second region.

At step 110, at least one channel is prevented from handing off by continuing to communicate data over the portion of that channel associated with the first region. While data continues to be communicated through this channel portion associated with the first region, at step 120 simultaneous communication of data begins through at least another channel's channel portion associated with the second region. At step 120, data is communicated with the mobile device via a portion of one channel associated with the first region and a portion of another channel associated with the second region. Finally, at step 130, data communication, via the channel portion associated with the first region, is discontinued.

FIG. 2 illustrates a slightly more detailed method in which embodiments of the present invention may be practiced. This method is similar to the method of FIG. 1, and includes an additional step at 230 of confirming that communication is occurring through a portion of at least one channel associated with the second region. If data is not yet communicating through a portion of at least one channel of the second region, then the method is directed back to step 210, which continues to communicate data through a first portion of at least one channel associated with a first region. At step 220, simultaneous communication of data begins through at least another channel's channel portion associated with the second region. Again step 230 confirms that communication is occurring through a portion of at least one channel associated with the second region, before proceeding to the final step 240 of allowing all channels to handoff, including channels communicating data via channel portions associated with the first region.

Turning now to FIG. 3, an illustrative environment in shown suitable for practicing an embodiment of the present invention. The illustrative environment depicts two geographic regions First Region 330 and Second Region 340 and a Handoff Area 350 located at the intersection of First Region 330 and Second Region 340. In this illustrative operating environment, mobile devices communicate with a communications network via channel portions 311, 321, 312, and 322 of communications channels First Channel 310 and Second Channel 320. Each portion of a communication channel is associated with a geographic region.

Accordingly, First Channel 310 has two channel portions, Portion 1A 311 and Portion 1B 312, associated with First Region 330 and Second Region 340, respectively. Channel Portion 1A 311 and Portion 1B 312 intersect and overlap over a small geographic area within Handoff Area 350 and identified as first-channel intersection 331. Similarly, Second Channel 320 has two channel portions, Portion 2A 321 and Portion 2B 322, associated with First Region 330 and Second Region 340, respectively. Channel Portion 2A 321 and Portion 2B 322 intersect and overlap over a small geographic area within Handoff Area 350 and identified as second-channel intersection 332. For the sake of simplicity, only two communication channels are depicted in the illustrative environment of FIG. 3, First Channel 310 and Second Channel 320.

But it is understood that additional communication channels may be used in practicing embodiments of the present invention. The illustrative operating environment of FIG. 3 is just that. Not all elements are shown, components shown, etc. Doing so would obscure the present invention.

The channel portions 311, 321, 312, and 322 are propagated via RF emitters located within each region and which may be situated on towers 306 and 316. Towers 306 and 316 in turn are each coupled to a BTS which is coupled to a communications network controller such as RNCs 305 and 315. Although this illustrative environment shows RNCs 305 and 315 situated approximately near towers 306 and 316, respectively, they may also be located off site. The approximate boundaries of First Region 330 and Second Region 340 are determined by the power-levels of the RF propagation of the channel portions associated with those regions. Likewise, the RF power-levels determine the approximate locations of first-channel intersection 331 and second-channel intersection 332. Handoff Area 350 includes the geographic area where channel portions overlap including channel intersections 331 and 332.

Generally, a mobile device communicates via the channel portions associated with the region in which it is located, since these channel portions likely have the strongest signal strength detected by the mobile device. As the device travels from one region to another, while communicating with the communications network, a handoff of the channel portions within each channel typically occurs. In the illustrative operating environment shown in FIG. 3, the physical propagation environment of communication-channel First Channel 310 and Second Channel 320 is configured to create diversity in handoff occurrences. This is accomplished by geographically separating the physical locations of first-channel intersection 331 and second-channel intersection 332.

Thus, handoffs occur at different times within each communication channel, as the device, while communicating with the communication network, travels from First Region 330 to Second Region 340 and crosses through the Handoff Area 350. Specifically, as the device travels toward Second Region 340 and enters Handoff Area 350, it first passes through first-channel intersection 331, where a handoff occurs within First Channel 310 from Portion 1A to Portion 1B. As the device continues on and enters Second Region 240, it passes through second-channel intersection 332, where a handoff occurs within Second Channel 320 from Portion 2A to Portion 2B. Thus, as a mobile device travels through the illustrative environment depicted in FIG. 3, handoffs within each communication channel occur at different times thereby providing handoff diversity.

Figure 4:
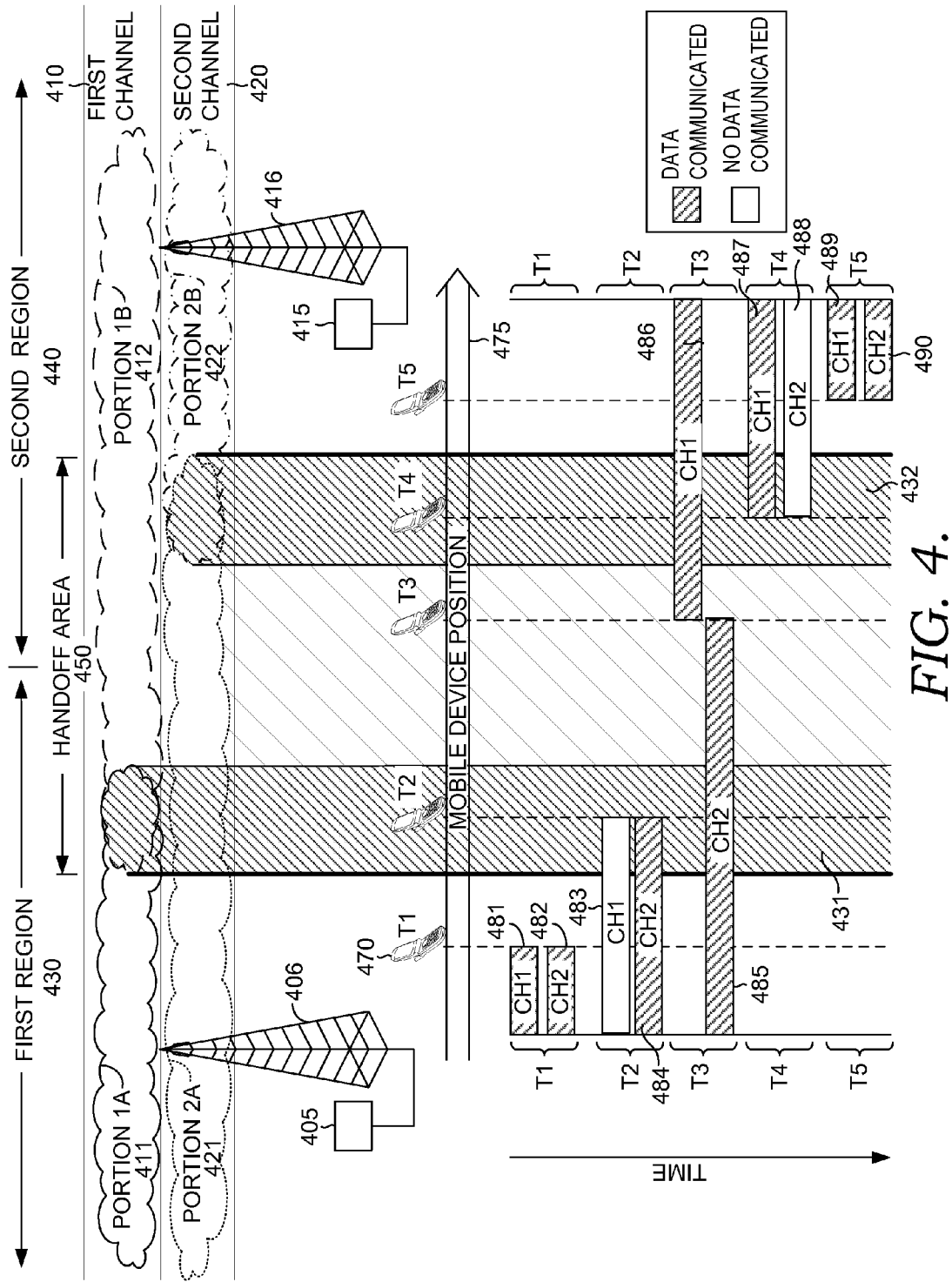
FIG. 4 is a more detailed view of an exemplary environment using RF optimization for creating handoff diversity, which depicts channel handoffs occurring as the mobile device changes position from a first region to a second region according to an embodiment of the present invention.

FIG. 4 illustrates an illustrative embodiment of the present invention depicting a handoff session operation occurring within the illustrative environment of FIG. 3. Components of FIG. 4 that contain the same last two digits are understood to be analogous to corresponding components from FIG. 3. Therefore, First Channel 410 is understood to be similar or identical to First Channel 310 from the previous figure. As such, Second Channel 420, Portion 1A 411, Portion 1B 412, Portion 2A 421, Portion 2B 422, RNCs 405 and 415, towers 406 and 416, etc., will not be discussed in further detail as they are similar to the features discussed in connection to FIG. 3.

Continuing with FIG. 4, in the illustrative environment shown, a mobile device 470 can wirelessly communicate with a communications network. Mobile device 470 can take on a variety of forms. In one embodiment, mobile device 470 takes the form of a mobile phone or device that includes mobile-phone functionality. Illustrative devices include a 3G device, a smart phone, a personal digital or data assistant (PDA), a palm-type device, an EV-DO card, WiMax compatible chipsets, any electronics device that includes mobile-phone technology, including software- or hardware-defined radios, or a computer peripheral that facilitates wireless communications of the type contemplated by a wireless communications network. Further, mobile device 470 may be mounted to a vehicle or integrated with another machine or product. Likewise, various embodiments of mobile device 470 are capable of handling different forms of data including, for example but not limited to, audio, video, voice data, and multimedia.

As shown in FIG. 4, mobile device 470 travels from First Region 430 to Second Region 440 through Handoff Area 450. To provide a better understanding of the entire handoff operation as it occurs in this embodiment of the present invention, the lower portion of FIG. 4 illustrates five snapshots in time, T1 though T5, occurring as mobile device 470 changes location from First Region 430 to Second Region 440. Mobile Device Position 475 depicts the approximate location of mobile device 470 with respect to each region and the handoff area.

Communication connections 481 through 490 provide an illustration of mobile device 470's communication via the portions of First Channel 410 and Second Channel 420. These illustrative connections show the portions of communication channels 410 and 420 that, at any moment in time, are communicating data with mobile device 470. Thus at time T1, mobile device 470 is in First Region 430 and is communicating via Portion 1A 411 and Portion 2A 421 of First Channel 410 and Second Channel 420, respectively, as indicated by communication connections 481 and 482. At time T2, mobile device 470 has entered Handoff Area 450 and first-channel intersection 431. As mobile device 470 enters first-channel intersection 431, it detects the BTS and RNC of Second Region 440 via channel Portion 1B 412 and communicates this information to the communications network. This initiates a handoff within First Channel 410 from Portion 1A 411 to Portion 1B 412 Thus at time T2, mobile device is communicating only through Second Channel 420 via Portion 2A 421, as indicated by communication connections 484. No data is communicated through First Channel 410 at this time, as indicated by communication connection 483, because of the handoff occurring within First Channel 410 from Portion 1A 411 to Portion 1B 412.

At time T3, mobile device 470 has traveled through first-channel intersection 431 and completed a handoff within First Channel 410 from Portion 1A 411 to Portion 1B 412. Mobile device 470 is still located within Handoff Area 450 and has not yet completed a handoff within the Second Channel 420. In terms of the canyon-crossing analogy described above, at time T3 our canyon-crossers are each on opposite sides of the canyon, as the device at time T3 is communicating via channel Portion 2A 421 of the First Region 430 and channel Portion 1B 412 of Second Region 440, as indicated by communication connections 485 and 486, respectively.

At time T4, mobile device 470 has entered second-channel intersection 432. As mobile device 470 enters second-channel intersection 432, it detects the BTS and RNC of Second Region 440 via channel Portion 2B 422 and communicates this information to the communications network. This initiates a handoff within Second Channel 420 from Portion 2A 421 to Portion 2B 422 Thus at time T4, mobile device 470 is communicating only through First Channel 410 via Portion 1B 412, as indicated by communication connections 487. No data is communicated through Second Channel 420 at this time, as indicated by communication connection 488, because of the handoff occurring within Second Channel 420 from Portion 2A 421 to Portion 2B 422. Finally, at time T5, mobile device 470 has left Handoff Area 450 including second-channel intersection 432, and all handoffs are completed for both First Channel 410 and Second Channel 420. As indicated by communication connections 489 and 490, mobile device 470 is communicating via channel portions Portion 1B 412 and Portion 2B 422 associated with Second Region 440.

Figure 5:
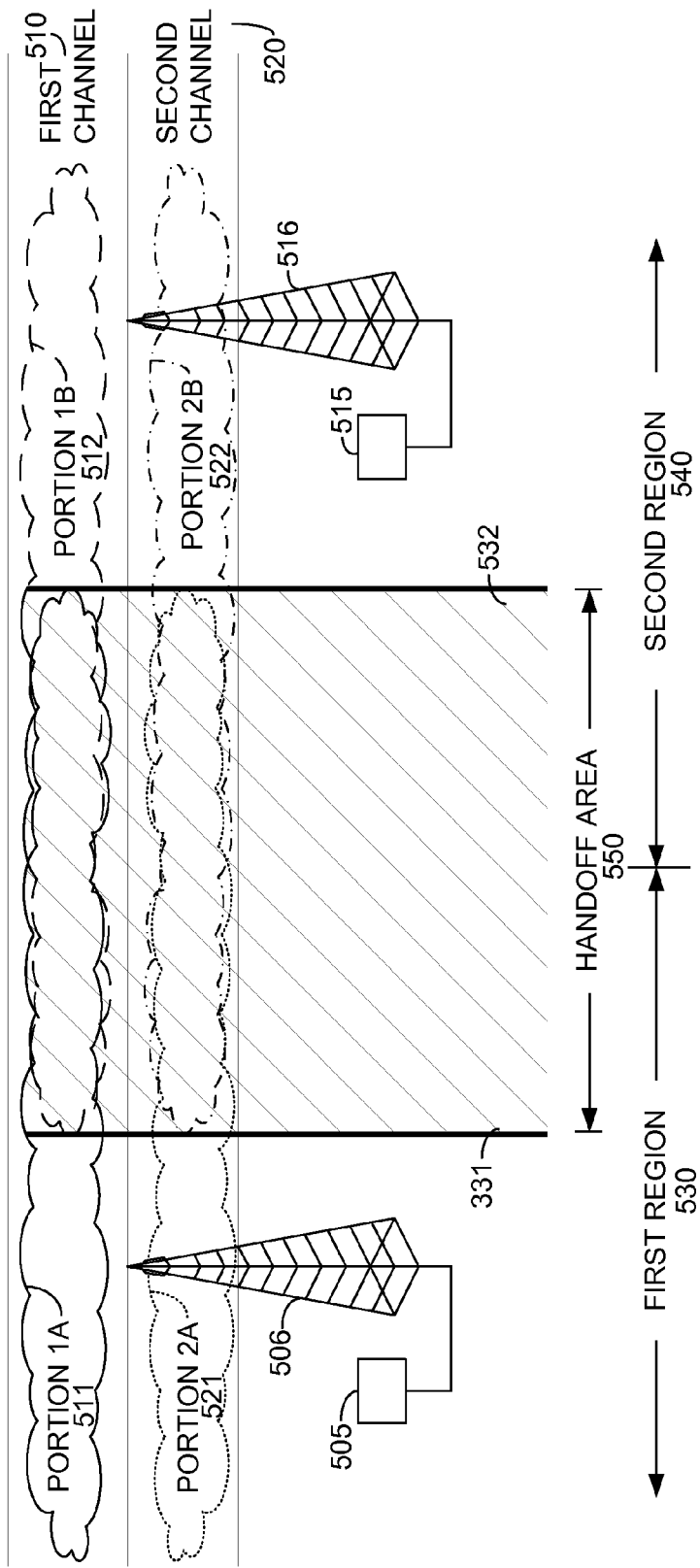
FIG. 5 is a view of an exemplary environment suitable for practicing an embodiment of the present invention that uses communications-network intelligence for creating handoff diversity according to an embodiment of the present invention.

Turning to FIG. 5, another illustrative environment in shown suitable for practicing an embodiment of the present invention. Components of FIG. 5 that contain the same last two digits are understood to be analogous to corresponding components from FIGS. 3 and 4. Therefore, First Channel 510 is understood to be similar or identical to First Channel 310 from FIG. 3. As such, Second Channel 520, Portion 1A 511, Portion 1B 512, Portion 2A 521, Portion 2B 522, RNCs 505 and 515, towers 506 and 516, etc., will not be discussed in further detail as they are similar to the features discussed in connection to FIGS. 3 and 4.

The illustrative environment depicted in FIG. 5 is similar to the environment shown in FIG. 3. However, in the illustrative environment of FIG. 5, Handoff Area 550 coincides with the geographic regions formed by the intersection and overlapping region of channel Portion 1A 511 with Portion 1B 512 and Portion 2A 521 with Portion 2B 522. In embodiments of the present invention operating in this environment, no change to the physical propagation environment of the communication channels is required to provide handoff diversity. Rather, the communications network or mobile device is configured to force channel-handoff diversity by delaying a handoff for one or more communication channels. However, it is contemplated within the scope of the present invention that operating environments of FIGS. 3 and 5 could be used in combination.

Figure 6:
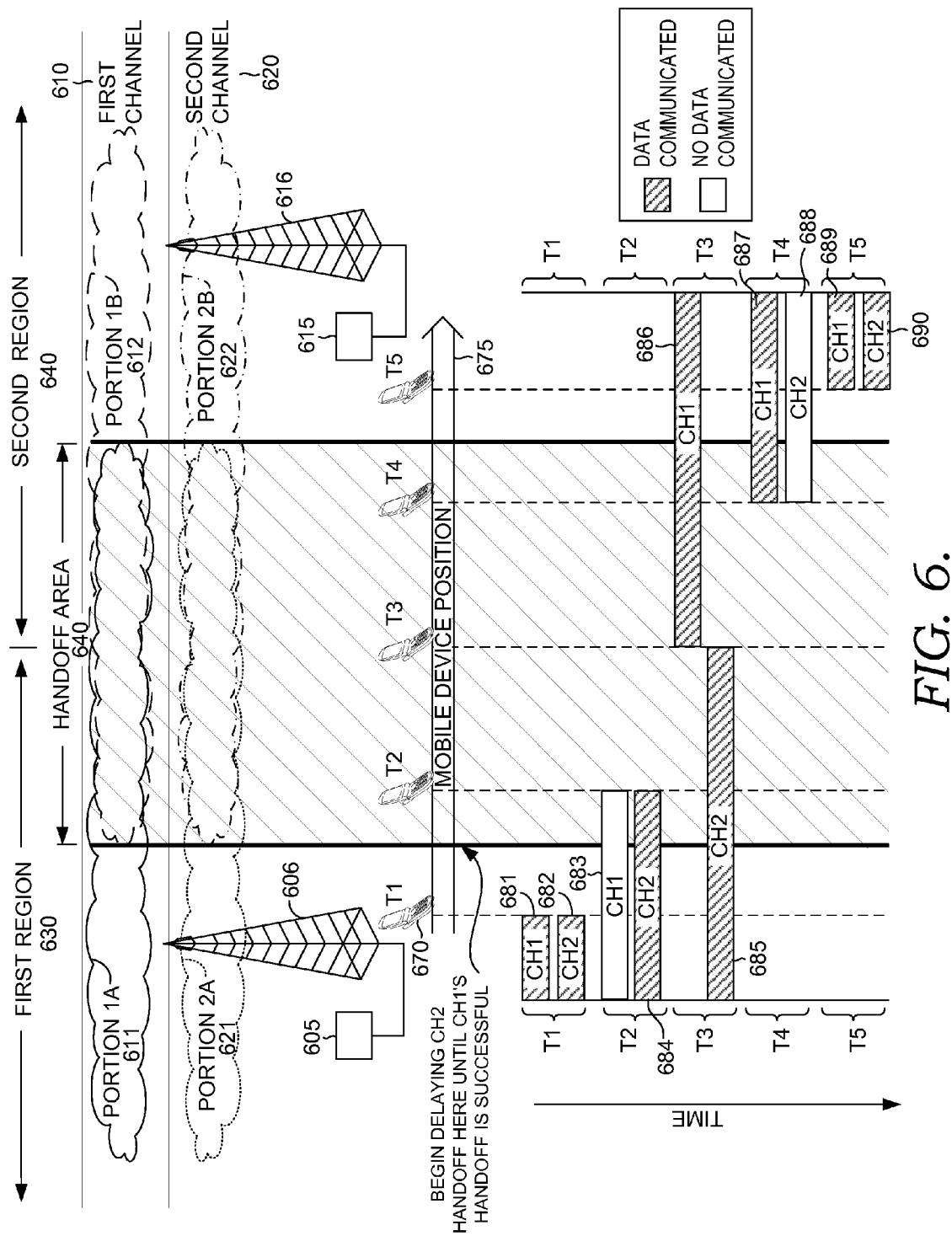
FIG. 6 is a more detailed view of an exemplary environment using communications-network intelligence for creating handoff diversity and depicting channel handoffs occurring as the mobile device changes position from a first region to a second region according to an embodiment of the present invention.

FIG. 6 illustrates an illustrative embodiment of the present invention depicting a handoff session operation occurring within the illustrative environment of FIG. 5. As described in connection to FIGS. 3-5, components of FIG. 6 that contain the same last two digits are understood to be analogous to corresponding components from FIGS. 3-5. Therefore, First Channel 610 is understood to be similar or identical to First Channel 310 from FIG. 3. As such, Second Channel 620, Portion 1A 611, Portion 1B 612, Portion 2A 621, Portion 2B 622, RNCs 605 and 615, towers 606 and 616, etc., will not be discussed in further detail as they are similar to the features discussed in connection to FIGS. 3-5.

Continuing with FIG. 6, in the illustrative environment shown, mobile device 670 travels from First Region 630 to Second Region 640 through Handoff Area 650. To provide a better understanding of the entire handoff operation as it occurs in this embodiment of the present invention, the lower portion of FIG. 6 illustrates five snapshots in time, T1 though T5, occurring as mobile device 670 changes location from First Region 630 to Second Region 640. Mobile Device Position 675 depicts the approximate location of mobile device 670 with respect to each region and the handoff area.

Communication connections 681 through 690 provide an illustration of mobile device 670's communication via the portions of First Channel 610 and Second Channel 620. These illustrative connections show the portions of communication channels 610 and 620 that, at any moment in time, are communicating data with mobile device 670. Thus at time T1, mobile device 670 is in First Region 630 and is communicating via Portion 1A 611 and Portion 2A 621 of First Channel 610 and Second Channel 620, respectively, as indicated by communication connections 681 and 682.

At time T2, mobile device 670 has entered Handoff Area 650. As mobile device 670 enters Handoff Area 650, it detects the BTS and RNC of Second Region 640 via channel Portion 1B 612 and Portion 2B 622 and communicates this information to the communications network. Using this information, RNC 605 or RNC 615, working with mobile device 670, can initiate a handoff operation within First Channel 610 and select Second Channel 620 to be a delayed-handoff channel forcing the handoff of Second Channel 620 to wait until the handoff within First Channel 610 has completed successfully. Thus at time T2, mobile device 670 continues communicating through Second Channel 620 via Portion 2A 621, as indicated by communication connections 684. No data is communicating through First Channel 610 at this time, as indicated by communication connection 683, because a handoff is occurring within First Channel 610 from Portion 1A 611 to Portion 1B 612.

At time T3, mobile device 670 has completed a handoff within First Channel 610 from Portion 1A 611 to Portion 1B 612. Mobile device 670 is still located within Handoff Area 650 and has not yet completed a handoff within the Second Channel 620. In terms of the canyon-crossing analogy described above, at time T3 our canyon-crossers are now on each side of the canyon, as mobile device 670 at time T3 is communicating via channel Portion 2A 621 of the First Region 630 and channel Portion 1B 612 of Second Region 640, as indicated by communication connections 685 and 686, respectively.

At time T4, once RNC 605 or RNC 615 confirms that the handoff within First Channel 610 is completed, or once a sufficient period of time has passed to reasonably allow the handoff within First Channel 610 to occur, RNC 605 can break or terminate the original data flow via delayed-handoff channel Second Channel 620 and allow Second Channel 620 to handoff from Portion 2A 621 to Portion 2B 622 Thus at time T4, mobile device 670 is communicating only through First Channel 610 via Portion 1B 612, as indicated by communication connections 687. No data is communicated through Second Channel 620 at this time, as indicated by communication connection 688, because of the handoff occurring within Second Channel 620 from Portion 2A 621 to Portion 2B 622. Finally, at time T5, mobile device 670 has left Handoff Area 650 and all handoffs are completed for both First Channel 610 and Second Channel 620. As indicated by communication connections 689 and 690, mobile device 670 is communicating via channel portions Portion 1B 612 and Portion 2B 622 associated with Second Region 640.

Figure 7:
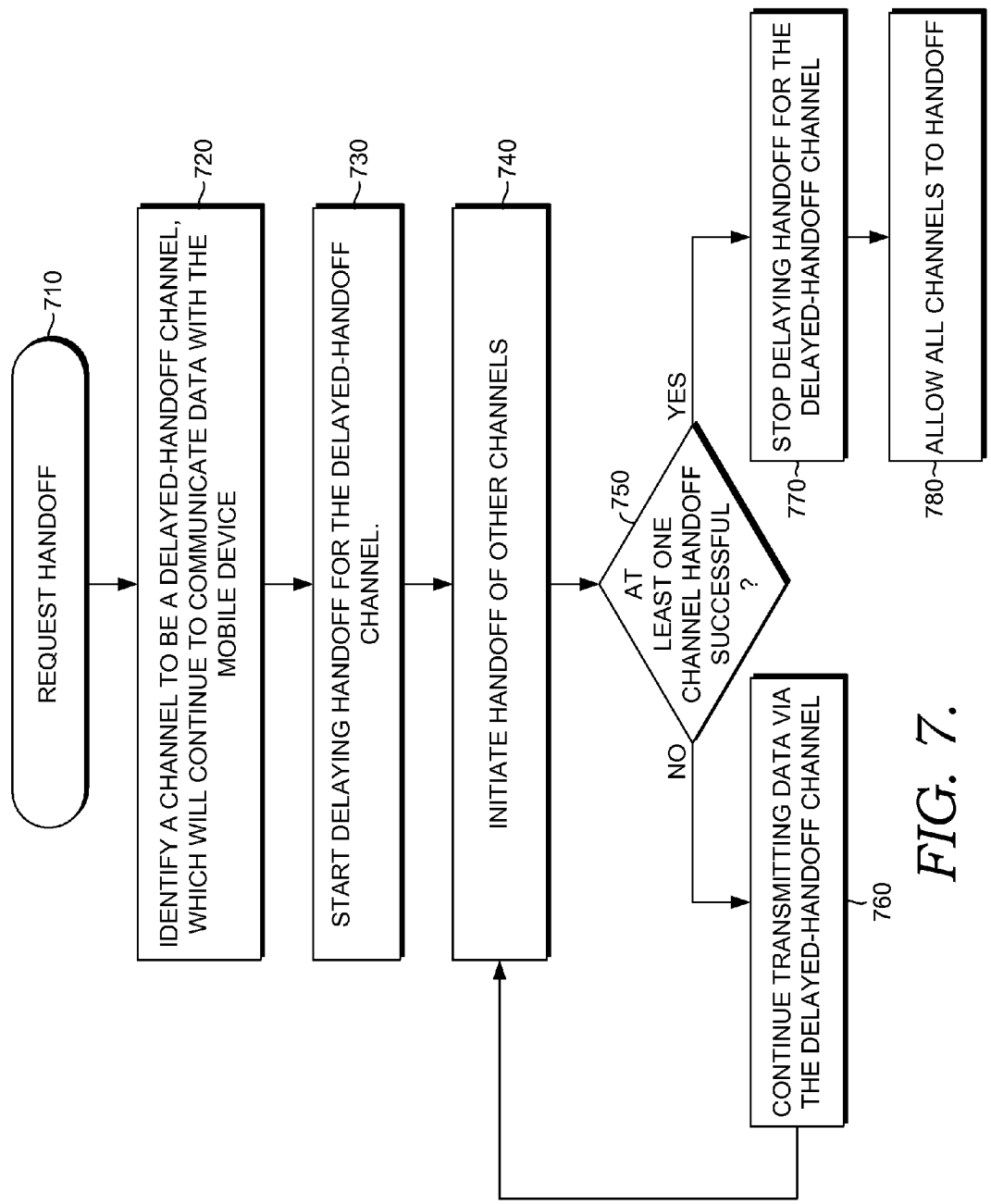
FIG. 7 is a method by which the present invention may be used in order to create channel-handoff diversity by using communications-network intelligence to delay a handoff for one or more communication channels according to an embodiment of the present invention.

Turning now to FIG. 7, one embodiment is provided of a method of increasing robustness of a communications session through forcing channel-handoff diversity by delaying a handoff for one or more communication channels. At step 710, a handoff session is requested by either a mobile device or a communications network controller. This typically occurs as the mobile device leaves a first geographic region associated with a first BTS or RNC and enters a second geographic region associated with a second BTS or RNC. At step 720, at least one communications channel communicating with the mobile device is selected to be a delayed-handoff channel. This channel will be prevented from handing off by forcing communication to continue through the channel portion associated with the geographic region that the mobile device is leaving. Thus, at step 730, the delayed-handoff channel is prevented from handing off and communication is forced to continue through the channel portion associated with the geographic region that the mobile device is leaving. This may be accomplished by several ways including, but not limited to denying a request to handoff within the delayed-handoff channel, ignoring a request to handoff within the delayed-handoff channel, or withholding network resources required to facilitate a handoff within the delayed-handoff channel. Now that at least one channel is being prevented from handing off, step 740 initiates handoff operations for other channels communicating data with the mobile device. Step 750 determines whether a handoff for any other channel has successfully completed. This step may be implemented by several methods including but not limited to detecting at the mobile device or communications network controller that a handoff for another channel has completed, by receiving a confirmation indicating that another handoff has completed, or by simply delaying the delayed-handoff channel from handing off for a time interval before allowing the delayed channel to handoff. If it is determined at step 750 that another channel has not handed off successfully, then at 760, data is continued to be communicated via the delayed-handoff channel, and at step 740 handoff operations are reinitiated or continued for other channels communicating data with the mobile device. However, if at step 750, a handoff has successfully completed for any other channel, then proceeding to step 770, the delayed-handoff channel is no longer prevented from handing off. At this point, in terms of the canyon-crossing analogy described above, our canyon-crossers have one person on the other side of the canyon, because at least one channel has completed a handoff. Finally at step 780, all remaining channels are allowed to handoff.

Figure 8:
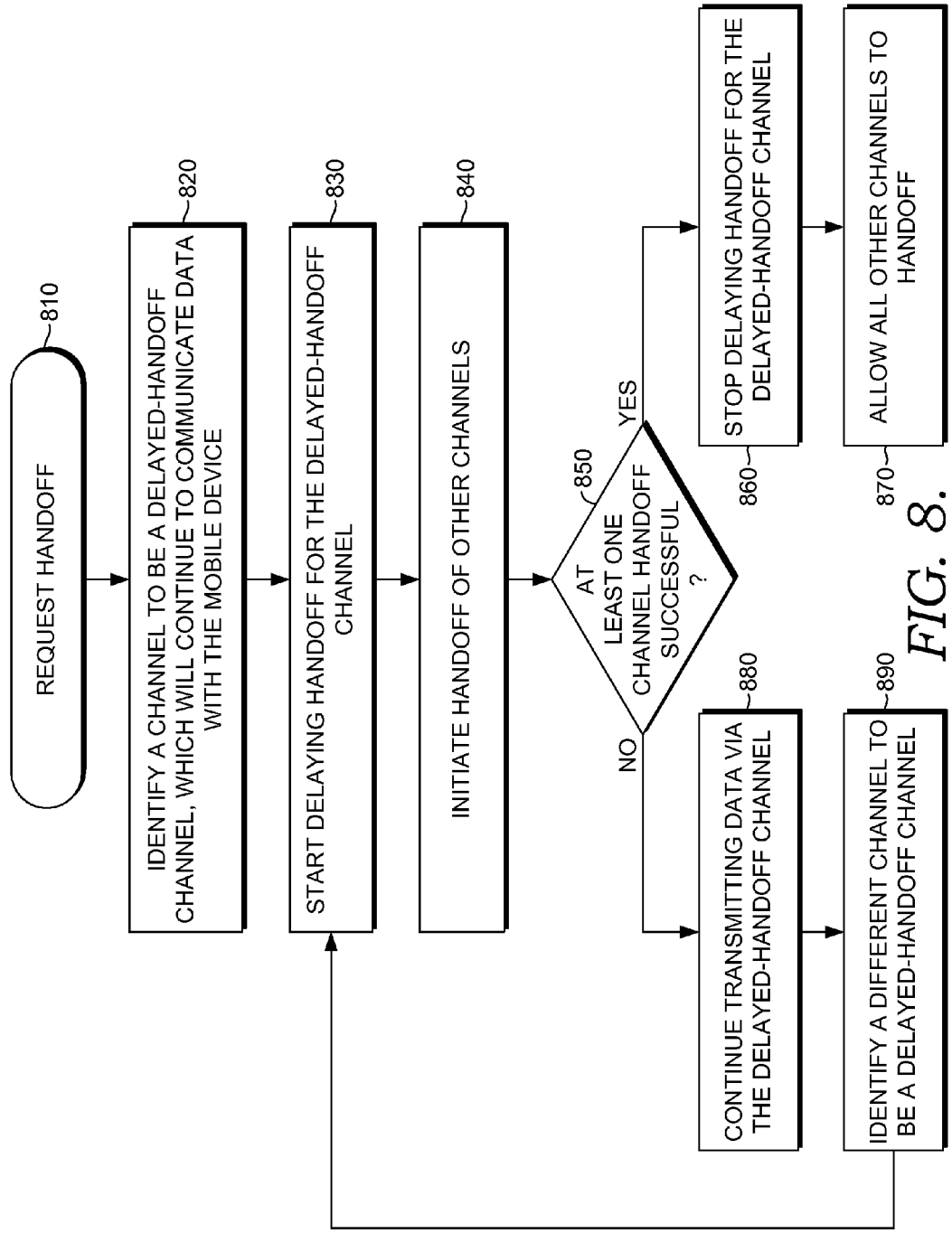
FIG. 8 is a method by which the present invention may be used in order to create channel-handoff diversity by using communications-network intelligence to delay a handoff for one or more communication channels according to an embodiment of the present invention.

FIG. 8 illustrates another embodiment of a method of increasing robustness of a communications session through forcing channel-handoff diversity by delaying a handoff for one or more communication channels. The method illustrated in FIG. 8 is similar, but not identical to, the method of FIG. 7. Because many of the steps in FIG. 8 are identical or similar to those of FIG. 7, only important differences will be described. Accordingly, following step 850, which determines whether a handoff for any other channel has successfully completed, if a handoff has not completed, then at step 880, data is continued to be communicated via the delayed-handoff channel until step 890 which selects a different channel to be the delayed-handoff channel. This new delayed-handoff channel is then prevented from handing off at step 830. In terms of the canyon-crossing analogy described above, if the first person that steps across the canyon isn't successful they can be pulled back up and the second person can make an attempt to step across the canyon. Thus at step 840, a handoff is initiated, reinitiated, or continued for all other channels, including the channel originally selected as the delayed-handoff channel.

Figure 9A:
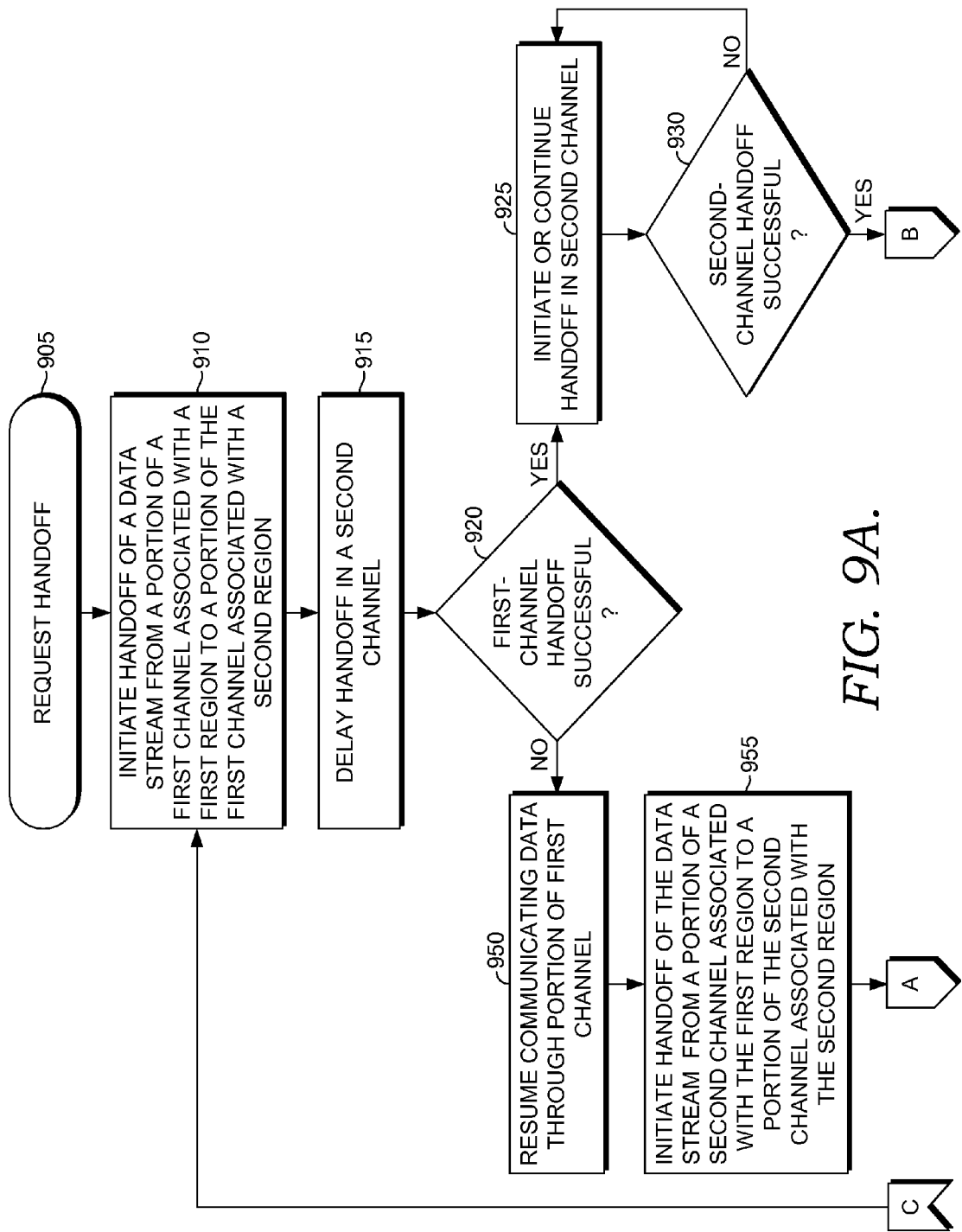
FIGS. 9A-9B are a more detailed view of a method by which the present invention may be used in order to create channel-handoff diversity by using communications-network intelligence to delay a handoff for one or more communication channels according to an embodiment of the present invention.
Figure 9B:
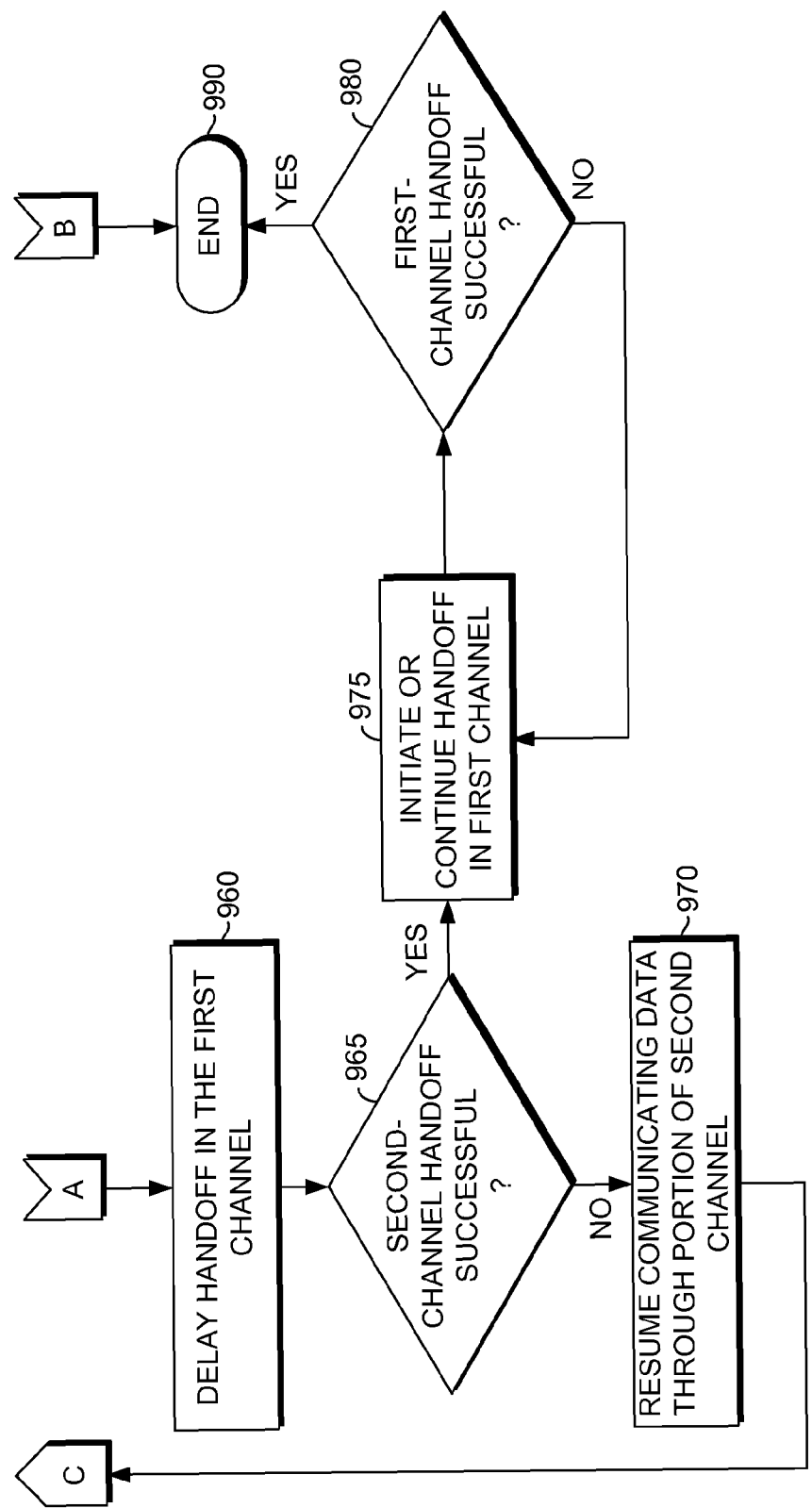

Turning now to FIGS. 9A and 9B, a more detailed illustration is provided of an embodiment of a method of increasing robustness of a communications session through forcing channel-handoff diversity by delaying a handoff for one or more communication channels. In this illustrative embodiment of the present invention, only two communications channels are described, for the sake of simplicity. It is understood that additional communications channels are contemplated within other embodiments. At step 905, a handoff session is requested by either a mobile device or a communications network controller. This typically occurs as the mobile device leaves a first geographic region associated with a first BTS or RNC and enters a second geographic region associated with a second BTS or RNC. At step 910, a handoff is initiated, within a first channel, from the portion of the first channel associated with the first region to a portion of the first channel associated with the second region. At step 915, the second channel is delayed from handing off. This may be accomplished by several ways including, but not limited to denying a request to handoff within the second channel, ignoring a request to handoff within the second channel, or withholding network resources required to facilitate a handoff within the second channel. Step 920 determines whether a handoff for the first channel has successfully completed. This step may be implemented by several methods including but not limited to detecting at the mobile device or communications network controller that a handoff for the first channel has completed, by receiving a confirmation indicating that the handoff has completed, or by simply delaying the second channel from handing off for a time interval before allowing the second channel to handoff. If it is determined at step 920 that the first channel has not handed off successfully, then at step 950, communication of data through the first channel resumes via the portion of the first channel associated with the first region, and at step 955, a handoff is initiated within the second channel. The following step 960 delays a handoff within the first channel. Thus, after failing to handoff the first channel, while delaying handoff of the second channel, the roles of the channels are switched and handoff is attempted for the second channel while delaying handoff for the first channel. In terms of the canyon-crossing analogy described above, if the first person that steps across the canyon isn't successful they can be pulled back up and the second person can make an attempt to step across the canyon. Step 965 determines whether the handoff within the second channel has successfully completed. If it has not, then the roles of the channels are switched again, and at step 970 the communication of data through the second channel resumes. The method then proceeds back to step 910 which initiates handoff within the first channel. This process of switching may repeat until one of the channels is able to handoff successfully, until a time limit expires, or for a specified number of handoff attempts. Once it is determined that the first channel or second channel has handed off successfully, at steps 920 and 965 respectively, handoff is initiated within the other channel, at steps 925 or 975 respectively. Steps 930 and 980 determine whether this second handoff for the other channel has completed successfully. The handoff is initiated or continued, at steps 925 and 975, until the handoff is successful, until a time limit expires, or for a specified number of handoff attempts. Finally, once the second handoff operation has successfully completed, step 990 concludes the handoff session. At this point, the mobile device is located in the second region and is communicating data via portions of the first and second channels associated with the second region.

Figure 10A:
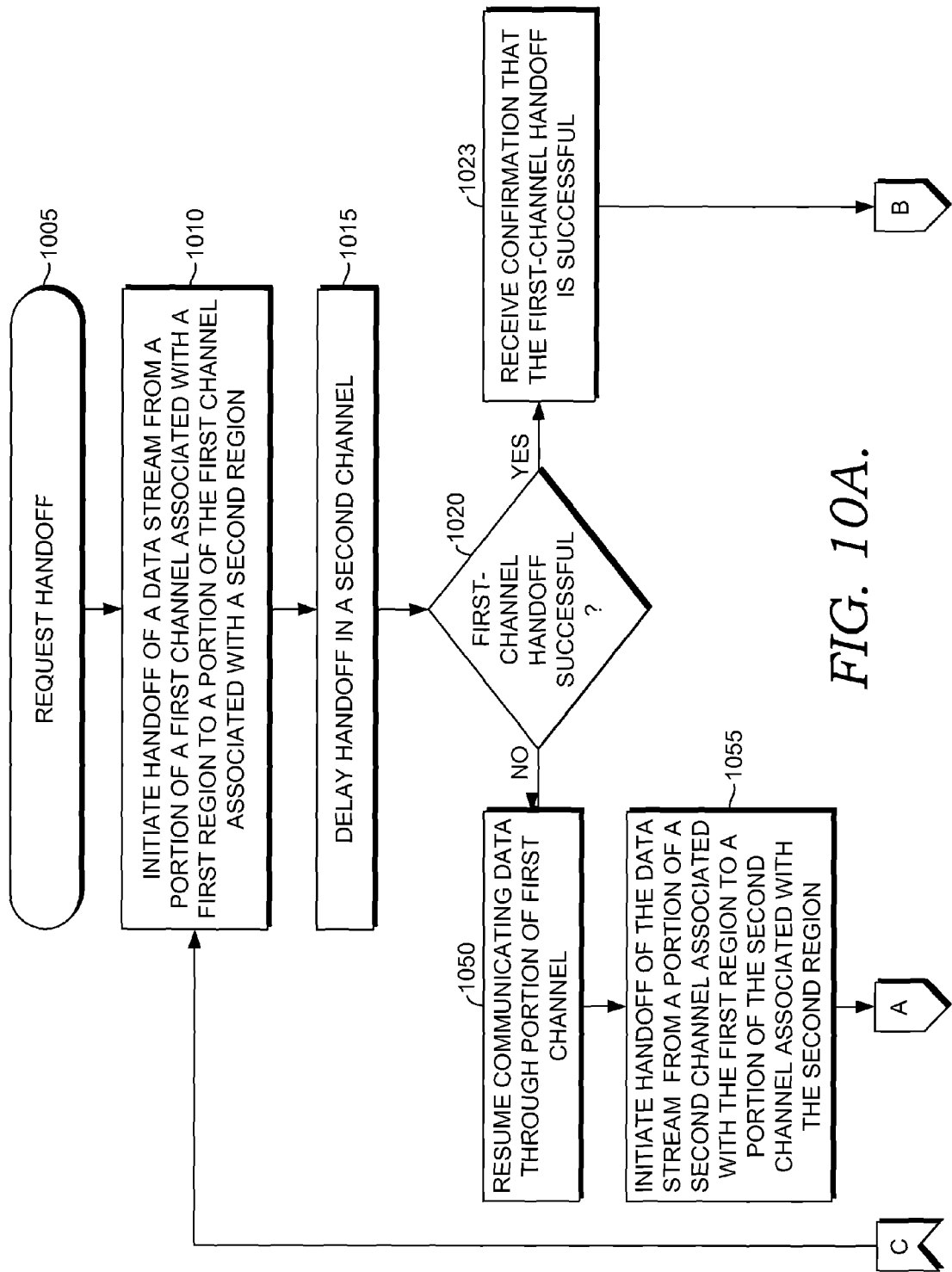
FIGS. 10A-10B are a more detailed view of a method by which the present invention may be used in order to create channel-handoff diversity by using communications-network intelligence to delay a handoff for one or more communication channels, and involving a confirmation step according to an embodiment of the present invention.
Figure 10B:
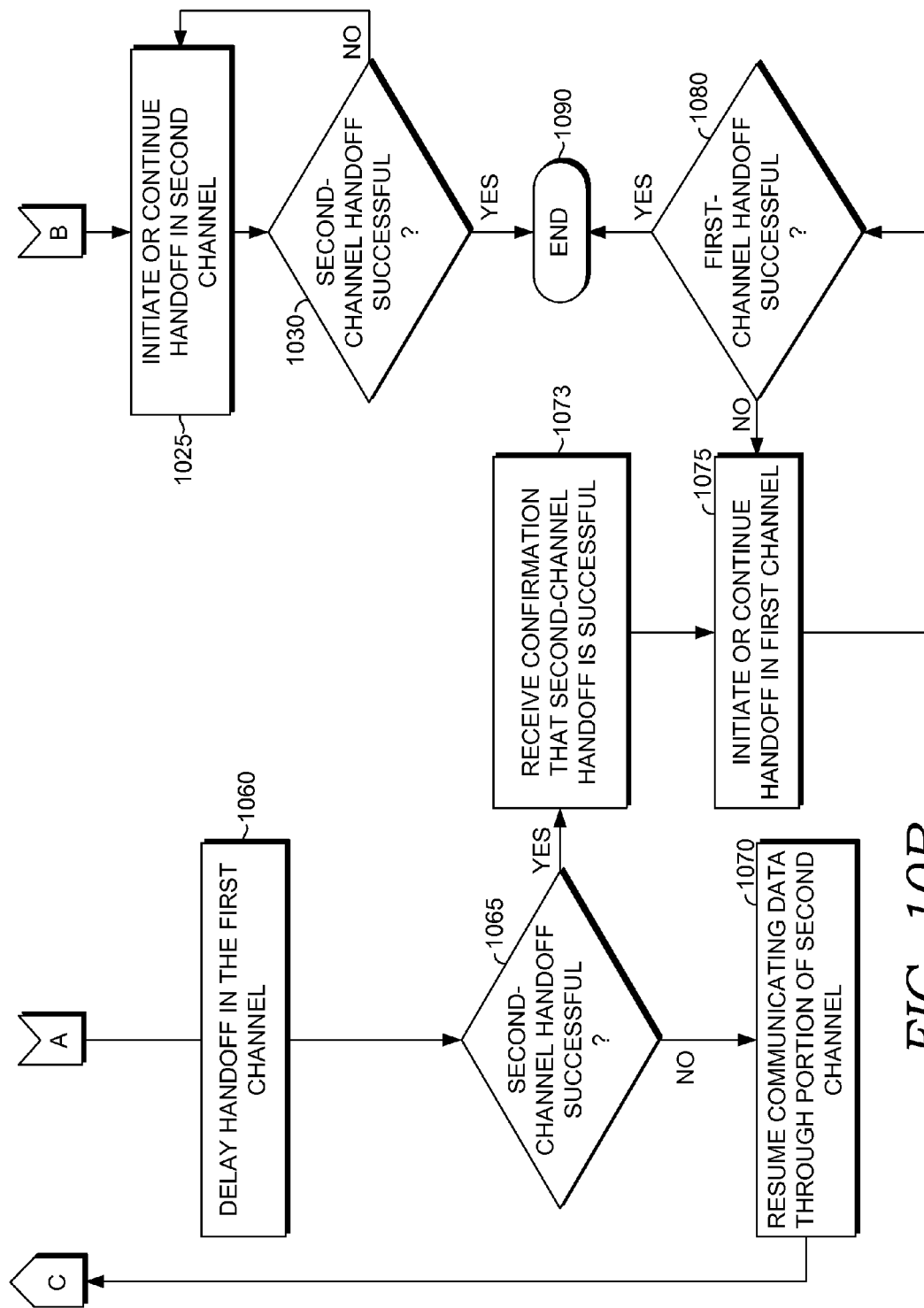

FIGS. 10A and 10B provide another detailed illustration of an embodiment of a method of increasing robustness of a communications session through forcing channel-handoff diversity by delaying a handoff for one or more communication channels. In this illustrative embodiment of the present invention, only two communications channels are described, for the sake of simplicity. It is understood that additional communications channels are contemplated within other embodiments. Furthermore, the method illustrated in FIGS. 10A and 10B is similar, but not identical to, the method illustrated in FIGS. 9A and 9B. Because many of the steps in FIGS. 10A and 10B are identical or similar to those of FIGS. 9A and 9B, only important differences will be described. Accordingly, in this embodiment, after a determination is made in steps 1020 or 1065 that the first or second channel handoff is successful, a confirmation is received at steps 1023 and 1073 indicating that the first or second channel handoff, respectively, is successful. The confirmation received at steps 1023 or 1073 may be received by the mobile device or a communications network controller. Following receipt of this confirmation, a handoff is initiated for the other channel. Specifically, following receipt of a confirmation indicating that the first channel handoff is successful at step 1023, a handoff is initiated in the second channel at step 1025. Similarly, following receipt of a confirmation indicating that the second channel handoff is successful at step 1073, a handoff is initiated in the first channel at step 1075.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-usable instructions embodied thereon for performing a method of increasing robustness of a communications session between a communications network and a mobile device, the communications session capable of communicating data via multiple channels, the method comprising:
   providing a first communication channel that facilitates communicating data that forms part of a data stream between the communications network and the mobile device, the first communication channel including a first and second channel portion, wherein the first channel portion is associated with a first geographic region and the second channel portion is associated with a second geographic region;
   providing a second communication channel that facilitates communicating data that forms part of the data stream between the communications network and the mobile device, the second communication channel including a first and second channel portion, wherein the first channel portion is associated with the first geographic region and the second channel portion is associated with the second geographic region;
   receiving at the communications network a handoff request to transition communication of the data stream from communicating through one or more of the first channel portions associated with the first region to communicating through one or more of the second channel portions associated with the second region; and
   maintaining communication of a first part of the data stream over the first portion of the first channel while initiating a handoff within the second channel of a second part of the data stream from the first portion of the second channel to the second portion of the second channel.

2. The media of claim 1, wherein the maintaining communication includes ignoring the received handoff request to transition communication of the data stream within the first channel.

3. The media of claim 1, further comprising:
   maintaining communication over the first portion of the first channel for a specified time interval; and
   after the time interval has lapsed, allowing a handoff to occur within the first channel.

4. The media of claim 1, further comprising maintaining communication until the handoff within the second channel is completed.

5. The media of claim 4, further comprising receiving a confirmation indicating that the second channel handoff is completed.

6. The media of claim 1, further comprising:
   maintaining communication over the first portion of the first channel for a specified time interval; and
   after the time interval has lapsed, if the handoff within the second channel has not completed, communicating the second part of the data stream over the first portion of the second channel while initiating a handoff within the first channel of the first part of the data stream from the first portion of the first channel to the second portion of the first channel.

7. The media of claim 1, further comprising:
   resending data forming part of the data stream if it was not communicated between the communications network and the mobile device because of the handoff.

8. One or more non-transitory computer-readable media having computer-usable instructions embodied thereon for performing a method of increasing robustness of a communications session between a mobile device and a communications network, the communications session capable of communicating data via multiple channels, the method comprising:
   providing a first communication channel that facilitates communicating data that forms part of a data stream between the mobile device and the communications network, the first communication channel including a first and second channel portion, wherein the first channel portion is associated with a first geographic region and the second channel portion is associated with a second geographic region;
   providing a second communication channel that facilitates communicating data that forms part of the data stream between the mobile device and the communications network, the second communication channel including a first and second channel portion, wherein the first channel portion is associated with the first geographic region and the second channel portion is associated with the second geographic region;
   detecting through the mobile device, conditions warranting a handoff for transitioning communication of the data stream from communicating through one or more of the first channel portions associated with the first region to communicating through one or more of the second channel portions associated with the second region; and
   maintaining communication of a first part of the data stream over the first portion of the first channel while initiating a handoff within the second channel of a second part of the data stream from the first portion of the second channel to the second portion of the second channel.

9. The media of claim 8, further comprising maintaining communication until the handoff within the second channel is completed.

10. The media of claim 9, further comprising sending to the communications network a confirmation indicating that the second-channel handoff is completed.

11. The media of claim 8, further comprising:
   maintaining communication over the first portion of the first channel for a specified time interval; and
   after the time interval has lapsed, if the handoff within the second channel has not completed, communicating the second part of the data stream over the first portion of the second channel while initiating a handoff within the first channel of the first part of the data stream from the first portion of the first channel to the second portion of the first channel.

12. A method of increasing robustness of a communications session between a mobile device and a communications network, the communications session capable of communicating data via multiple channels, the network including a plurality of radio frequency ("RF") emitters that emit RF over geographic regions that are respectively associated with at least one of the RF emitters, the method comprising:

providing a first RF power level associated with a first portion of a first channel in a first geographic region and that facilitates communicating data, the data forming part of a data stream associated with the mobile device;

providing a second RF power level associated with a second portion of the first channel, the second portion of the first channel being in a second geographic region and that facilitates communicating data, the data forming part of the data stream associated with the mobile device;

providing a third RF power level associated with a first portion of a second channel in the first region that facilitates communicating data, the data forming part of the data stream associated with the mobile device;

providing a fourth RF power level associated with a second portion of the second channel, the second portion of the second channel being in the second region and that facilitates communicating data, the data forming part of the data stream associated with the mobile device; and differentiating the first and third RF power levels associated with the first portions of each channel in the first region and differentiating the second and fourth RF power levels associated with the second portions of each channel in the second region, wherein the handoff location between the first and second portions of the first channel is geographically separated from the handoff location of the first and second portions of the second channel.

13. The method of claim 12, further comprising:
receiving at the communications network a handoff request to transition communication of the data stream from communicating through one or more of the first portions of each channel, to communicating through one or more of the second portions of each channel; and maintaining communication of a first part of the data stream over the first portion of the first channel while initiating a handoff within the second channel of a second part of the data stream from the first portion of the second channel to the second portion of the second channel.

14. The method of claim 13 further comprising maintaining communication until the handoff within the second channel is completed.

15. The method of claim 14 further comprising receiving at the communications network a confirmation indicating that the second-channel handoff is completed.

16. The method of claim 12 further comprising:
detecting through the mobile device conditions warranting a handoff session; and maintaining communication of a first part of the data stream over the first portion of the first channel while initiating a handoff within the second channel of a second part of the data stream from the first portion of the second channel to the second portion of the second channel.

17. The method of claim 12, wherein the mobile device comprises one of a phone, personal digital assistant, palm-type device, mobile computer, music player, and portable gaming device.

18. The method of claim 12, wherein the communication session utilizes a protocol compatible EV-DO Rev B standard.

19. One or more non-transitory computer-readable media having computer-usable instructions embodied thereon for performing a method of increasing robustness of a communications session between a communications network and a mobile device, the communications session capable of communicating data via multiple channels, the method comprising:

providing a first communication channel that facilitates communicating data that forms part of a data stream between the communications network and the mobile device, the first communication channel including a first and second channel portion, wherein the first channel portion is associated with a first geographic region and the second channel portion is associated with a second geographic region;

providing a second communication channel that facilitates communicating data that forms part of the data stream between the communications network and the mobile device, the second communication channel including a first and second channel portion, wherein the first channel portion is associated with the first geographic region and the second channel portion is associated with the second geographic region;

maintaining communication of a first part of the data stream over the first portion of the first channel while initiating a handoff within the second channel of a second part of the data stream from the first portion of the second channel to the second portion of the second channel, wherein the handoff transitions communication of the data stream from communicating through one or more of the first channel portions associated with the first region to communicating through one or more of the second channel portions associated with the second region.

20. The media of claim 19, further comprising:
maintaining communication over the first portion of the first channel for a specified time interval; and after the time interval has lapsed, if the handoff within the second channel has not completed, communicating the second part of the data stream over the first portion of the second channel while initiating a handoff within the first channel of the first part of the data stream from the first portion of the first channel to the second portion of the first channel.

* * * * *